(12) United States Patent  (10) Patent No.: US 9,363,357 B2
Hansen  (45) Date of Patent: Jun. 7, 2016

(54) DETECTING AND REPORTING A VEHICLE OF INTEREST (71) Applicant: Mirsani, LLC, Atlanta, GA (US)

(72) Inventor: Eric Anthony Hansen, Atlanta, GA (US)

(73) Assignee: Mirsani, LLC, Atlanta, GA (US)

( * ) Notice: Subject to any disclaimer, the term of this patent is extended or adjusted under 35 U.S.C. 154(b) by 0 days.

(21) Appl. No.: 14/696,508

(22) Filed: Apr. 27, 2015

(65) Prior Publication Data

US 2015/0312400 A1  Oct. 29, 2015

Related U.S. Application Data (60) Provisional application No. 61/984,366, filed on Apr. 25, 2014, provisional application No. 62/076,690, filed on Nov. 7, 2014.

(51) Int. Cl.
| | |
|---|---|
| *H04M 1/725* | (2006.01) |
| *G06K 9/22* | (2006.01) |
| *G06K 9/32* | (2006.01) |
| *G06K 9/00* | (2006.01) |

(52) U.S. Cl.
CPC ....... *H04M 1/72547* (2013.01); *G06K 9/00536* (2013.01); *G06K 9/00791* (2013.01); *G06K 9/22* (2013.01); *G06K 9/325* (2013.01); *G06K 2209/15* (2013.01); *G06K 2209/21* (2013.01); *H04M 2250/52* (2013.01)

(58) Field of Classification Search
CPC .............. H04M 1/72547; G06K 9/325; G06K 9/00791; G06K 9/00536; G06K 9/22; G06K 2209/15; G06K 2209/21
USPC ....................................... 455/575.9
See application file for complete search history.

(56) References Cited

U.S. PATENT DOCUMENTS

| 7,062,300 | B1 * | 6/2006 | Kim ........................... 455/569.1 |
| 8,243,140 | B1 * | 8/2012 | Howe ............................ 348/149 |
| 2008/0031426 | A1 * | 2/2008 | Weeks ............................ 379/45 |
| 2014/0201064 | A1 * | 7/2014 | Jackson et al. .................. 705/38 |
| 2015/0041536 | A1 * | 2/2015 | Matsur ........................... 235/382 |

* cited by examiner

Primary Examiner — Brandon Miller
(74) Attorney, Agent, or Firm — Thomas | Horstemeyer, LLP (57) ABSTRACT

Discussed are various systems, computer-readable mediums, and methods for determining a vehicle is of interest, referred to as a targeted vehicle, based on an image capture of the car. A user may position a mobile computing device on the dash of his or her vehicle. While the user is driving, the mobile computing device may collect image frames of other vehicles and transmit them to a remote server. The remote server may identify a vehicle as a targeted vehicle and notify one or more users of the identification including details regarding why the vehicle is targeted.

20 Claims, 7 Drawing Sheets

DETECTING AND REPORTING A VEHICLE OF INTEREST

CROSS-REFERENCE TO RELATED APPLICATIONS

This application claims the benefit of U.S. Provisional Application No. 61/984,366, filed Apr. 25, 2014 and claims the benefit of U.S. Provisional Application No. 62/076,690, filed Nov. 7, 2014. This application is related to U.S. patent application Ser. No. 14/191,743, entitled "DETECTING AND REPORTING IMPROPER ACTIVITY INVOLVING A VEHICLE," filed on Feb. 27, 2014. The complete disclosure of each of the foregoing priority and related applications are hereby fully incorporated herein by reference.

BACKGROUND

To locate a vehicle of interest, the police may add the vehicle to an All-points bulletin (APB). The APB is broadcast to law enforcement agencies, including a description of the vehicle so that police may be on the lookout. When a police officer sees the described vehicle, the officer may pull over the vehicle for further investigation.

BRIEF DESCRIPTION OF THE DRAWINGS

Many aspects of the present disclosure may be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure describes various systems and methods for determining if a vehicle is of interest, referred to as a targeted vehicle, based on a captured image of the car via a mobile computing device, such as a cellular phone or smartphone. As a non-limiting example, a user may position a cellular phone on the dash of his or her vehicle, in contrast to typical license plate recognition (LPR) which is performed by expensive customized hardware. While the user is driving, the cellular phone may collect image frames of other vehicles. The cellular phone may perform image processing operations on the image frames to identify one or more vehicles. The cellular phone may identify a representation of a vehicle's license plate in an image frame and transmit the image frame to a target identification application executed in a computing environment for processing. The target identification application may perform image recognition on the representation of the vehicle's license plate in the image frame to determine a corresponding license plate of the vehicle, and the target identification application may compare the license plate number to a list of targeted license plates. A license plate number may comprise letters, numbers, and/or symbols, among other known characters. If the license plate number matches one of the targeted license plates, the target identification application may initiate an action. In alternative embodiments, the user may indicate that a license plate is visible in an image frame by selecting a button, speaking a voice command, making a hand gesture, or providing some other type of indication. In response to detecting a representation of a license plate in at least one image frame, the cellular phone may transmit the at least one image frame and potentially other data to the target identification application. In some embodiments, the user device application executing on the cellular phone may extract the identified representation of the license plate and transmit the representation of the license plate rather than the entire image frame.

In some embodiments, the target identification application may obtain a list of targeted license plate numbers from a database. The target identification application may obtain an image from a cellular phone and identify a license plate number represented in the image. The target identification application may determine that the license plate number is represented in the list of targeted license plate numbers obtained from the database and initiate an action in response to determining that the license plate number is represented in the list of targeted license plate numbers. In some embodiments, the target identification application may detect a region of the image that represents a license plate, detect one or more license plate characters represented within the region of the image that represents the license plate, and identify the one or more license plate characters. The target identification application may compare the one or more license plate characters with the list of targeted license plate numbers to determine that the license plate number is represented in the list of targeted license plate numbers.

The target identification application may use approximate string matching to compare the license plate characters with the list of targeted license plate numbers. The image may comprise a photograph and/or a frame of a video. In some embodiments, each of the targeted license plate numbers is associated with an alleged crime, an alleged traffic infraction, an arrest warrant, and/or a reported suspicious activity. The database may comprise a third party database that operates on a computing device, such as targeted vehicle records device, and the third party database may comprises a government database, such as a targeted license plates data store. The target identification application may generate a first link corresponding to the image. The target identification application may also generate a second link corresponding to a map comprising an indication of a location associated with the image. In some embodiments, the target identification application initiates the action of transmitting a notification including the first link and the second link to a mobile computing device, such as a cellular phone. The terms image frame, image, frame of a video, and photograph may be used interchangeably herein.

In the following discussion, a general description of the system and its components is provided, followed by a discussion of the operation of the same.

Figure 1:
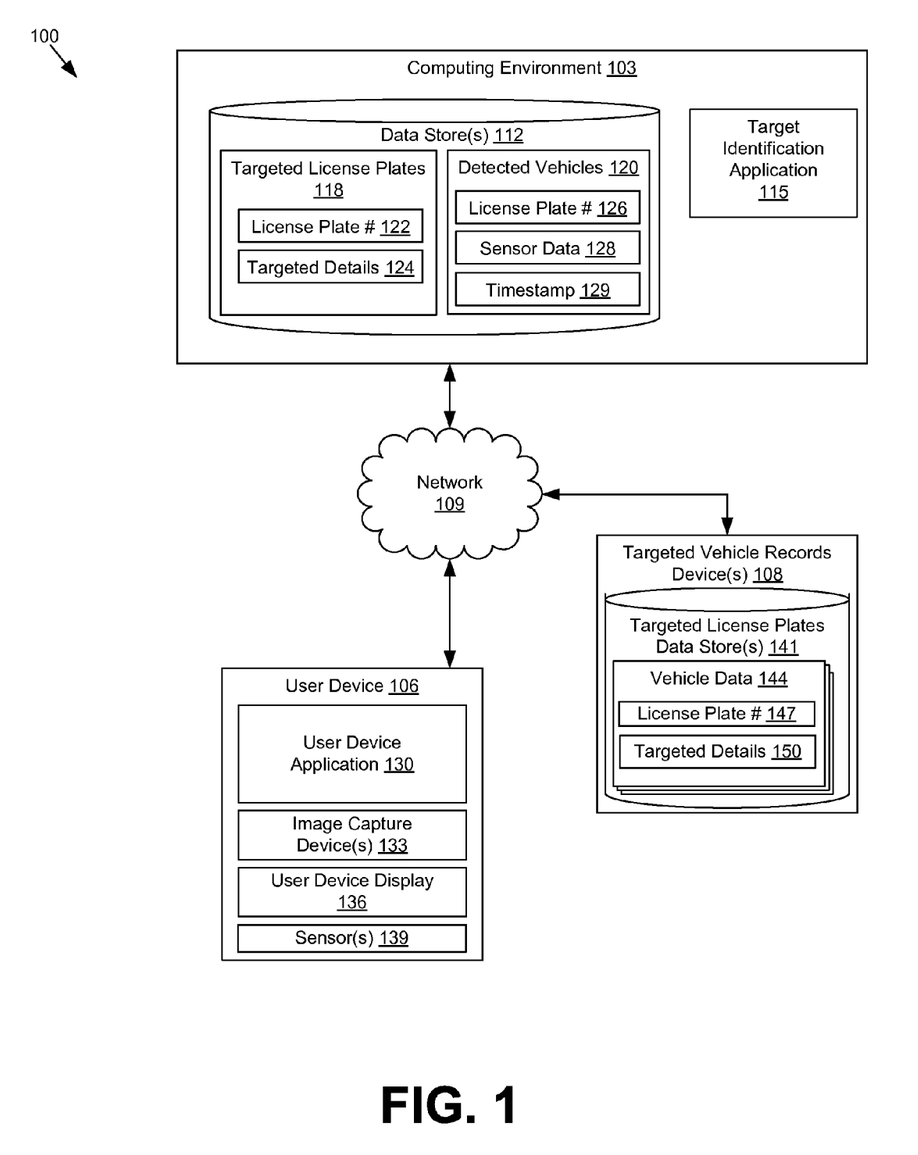
FIG. 1 is a drawing of a networked environment according to various embodiments of the present disclosure.

With reference to FIG. 1, shown is a networked environment 100 according to various embodiments. The networked environment 100 shown in FIG. 1 includes a computing environment 103, a mobile device 106, a targeted vehicle records device 108, and/or other devices in data communication via a network 109. The network 109 may include, for example, the Internet, one or more intranets, extranets, wide area networks (WANs), local area networks (LANs), wired networks, wireless networks, telephone networks, satellite networks, other suitable networks, and/or any combination of two or more such networks.

The computing environment 103 may comprise, for example, a server computer or any other system providing computing capability. Alternatively, the computing environment 103 may include multiple computing devices that are arranged, for example, in one or more server banks, computer banks, or other types of arrangements. For example, a plurality of computing devices together may form a cloud computing resource, a grid computing resource, and/or any other distributed computing arrangement. Such computing devices may be located in a single installation or may be distributed among many different geographical locations.

Various systems and functionality may be executed in the computing environment 103. For example, the computing environment 103 may provide and execute a target identification application 115 and/or other types of systems and/or functionality. The target identification application 115 may receive data comprising one or more images from a user device and detect a representation of a license plate number within the one or more images. The target identification application 115 may recognize the characters of the detected representation of the license plate within the one or more images to determine a license plate number of one or more vehicles represented in the one or more images. The target identification application 115 may query a data store 112 to find one of the targeted license plates 118 with a license plate 121 that matches the determined license plate number. In some embodiments, the target identification application 115 may obtain and store targeted license plates from third parties, such as from targeted vehicle records devices 108 in data store 112 on a periodic basis. The target identification application 115 may also query an external data source, such as a targeted vehicle records device 108. The target identification application 115 may also identify the license plate number as one of the targeted license plates 118. A vehicle having a targeted license plate is a targeted vehicle. A vehicle being a targeted vehicle may be an indication that the driver of the vehicle may have committed an improper activity. The improper activity may or may not be civil and/or criminal activity, such as a traffic violation. As non-limiting examples, the improper activity or unlawful activity may be abducting a child, stealing from a bank, having an outstanding arrest warrant, being accused of committing a crime, committing a traffic infraction, being reported as a person committing suspicious activity, and/or committing any other type of improper activity.

Various data is stored in one or more data stores 112 that are accessible to the computing environment 103. The data store 112 may include one or more targeted license plates 118, one or more detected vehicle records 120, and/or other data. The targeted license plates 118 may represent license plates identified as being suspicious of an activity or identified as of interest. For example, if a person reported a child being abducted by an individual driving a car having the license plate XYZABC, the targeted license plates 118 may have a record with a license plate #112 being set to "XYZABC" and targeted details 124 being set to "Child Abduction." The data in targeted license plates 118 or 141 may be reported by witnesses of a suspicious activity and/or entered by government employees. The detected vehicles 120 may represent vehicles that have been identified in one or more images as being targeted. For example, if a vehicle is detected in an image with a license plate number as "XYZABC" and the target identification application 115 identifies the vehicle as being a targeted, the targeted identification application 115 may store an entry in detected vehicles 120 including a license plate #122 set to "XYZABC," sensor data 128 set to the data from one or more sensors, such as the GPS location of the vehicle when the image was captured, and timestamp 129 set to the time when the image was taken.

The mobile device 106 is representative of multiple client computing devices that may be coupled to the network 109 and operated by users who, in some embodiments, are police officers. The mobile device 106 may comprise, for example, a processor-based system such as a computer system. Such a computer system may be embodied in the form of a mobile device, such as a cellular telephone, a music player, a tablet computer system, a web pad, a wearable computing device, a personal digital assistant, a laptop computer, or any type of mobile device. Alternatively, the mobile device 106 may be embodied in the form of a stationary computing device, such as a desktop computer, a security system for a building, or any other type of stationary computing device.

The mobile device 106 may be in communication with one or more image capture devices 133, a mobile device display 136, and one or more sensors 139. The mobile device 106 may execute a mobile device application 130 and/or other types of applications. The mobile device application 130 may be executed to capture data, such as images, video, direction the mobile device is facing, speed, force, ambient light, and/or GPS locations via image capture device 133 and sensors 139. The direction the mobile device is facing may include North, South, West, East, a combination of directions, or a degree offset from a direction, such as 33 degrees from North, among other methods of measuring the facing of a mobile device. The mobile device application 130 may also detect whether a vehicle and/or a vehicle license plate is located within a frame of the image capture device 133. In some embodiments, the vehicle license plate may be located within the frame of the image capture device when a user of the mobile computing device is driving behind the vehicle corresponding to the vehicle license plate. To this end, the mobile device application 130 may detect a representation of a license plate in an image frame and recognize characters of a license plate number represented in the image frame. Because the mobile device 106 may have a slower processing speed and less memory than that which is available to the computing environment 103, the data processing by the mobile device application 130 may be less rigorous than the data processing by the computing environment 103. Additionally or alternatively, the mobile device application 130 may be configured to receive a user input that indicates that the user believes that a vehicle with a license plate is located in a position such that the license plate is framed within a frame of the image capture device 133. Such an input may be, for example, a button being selected, a voice command, a gesture by the user, and/or any other type of input. The image capture device 133 is configured to receive light, which is then converted into image frames such as a photograph or a video. In some embodiments, the image frames may form a video sequence.

The sensors 139 may include, for example, a global positioning system (GPS) receiver, an accelerometer, a microphone, and/or any other type of component to that may provide data. The microphone may be used by the mobile device application 130 to indicate that a vehicle with a license plate is located within a frame of the image capturing device 133. For example, a user may speak a voice command that is received by the microphone and recognized by the mobile device application 130 as an indication to capture an image via image capture device 133.

The GPS receiver may receive GPS satellite signals and provide location data that represents the geographic location of the mobile device 106. This location data may be transmitted to the target identification application 115 via network 109 so that the geographical location may be identified of the user device when an image frame was captured of a vehicle.

The mobile device display 136 may comprise one or more liquid crystal displays (LCDs), cathode ray tube (CRT) displays, plasma displays, and/or any other type of display that provides visual renderings of data. For example, the mobile device display 136 may render one or more user interfaces that facilitate a user interacting with and controlling the mobile device 106.

The targeted vehicle records device 108 may comprise, for example, a server computer or any other system providing computing capability. In some embodiments, the targeted vehicle records device 108 may include multiple computing devices that are arranged in one or more server banks, computer banks, or other types of arrangements. Such computing devices may be located in a single installation or may be distributed among many different geographical locations. The targeted vehicle records device 108 may be operated by a government agency, such as a Department of Motor Vehicles or GOVCLOUD. Alternatively, the targeted vehicle records device 108 may be operated by a private entity that has collection information for vehicles. Alternatively, the targeted vehicle records device 108 may store data transferred from other databases, such as a database from a Department of Motor Vehicles, the FBI, the CIA, or a police database.

The vehicle records device 108 may include one or more vehicle records data stores 141. The vehicle records data stores 141 may include vehicle data 144 that represents various information regarding vehicles. For example, each entry of vehicle data 144 may include a license plate number 147 and targeted description 150, and/or other types of data.

The license plate number 147 may be used to identify a particular vehicle among other vehicles. The targeted description 150 may identify a reason the vehicle is targeted. The targeted description 150 may include, for example, the name and address of the owner, the name and address of an individual known to associate with the owner, one or more crimes the owner is accused of, one or more crimes an individual known to associate with the owner may be accused of, information regarding a theft of the vehicle, one or more suspicious activities related to the vehicle, such as an abduction of a child or an accident involving the vehicle, and/or various other activities The characteristics 173 may identify various features of a particular vehicle. For example, the characteristics 173 may represent the make and/or model of a vehicle, the color of the vehicle, and/or any other information regarding the vehicle.

Next, a general description of the operation of the various components of the networked environment 100 is provided.

To begin, a user may register to participate with the target identification application 115 and install the mobile device application 130 on his or her mobile device 106. After the mobile device application 130 has been installed on the mobile device 106, the mobile device application 130 can be executed.

The user may position the mobile device 106 in a way that facilitates the collection of data using the image capture device 133 and/or one or more of the sensors 139. In one embodiment, the mobile device 106 may be mounted on the dash of a vehicle so that other vehicles may be within the field of view of the image capture device 133 while the user is driving. For example, the mobile device 106 may be positioned so that vehicles that are in front of the vehicle of the user may be within the field of view of the image capture device 133. As another example, the user may, for example, hold mobile device 106 while walking on foot and position the image capture device 133 to view vehicles parked in a parking lot. As yet another example, the user may walk down a side walk and position the user device so that a vehicle parked at a stop light is within the field of view of the image capture device 133. As another example, a user may temporarily leave the mobile device 106 at a location to autonomously collect data even in his or her absence.

The mobile device application 130 may then collect data, such as image frames, location data, accelerometer data, sound, and/or other types of information using the image capture device 133 and/or the sensors 139. Since the collected data may be used to justify a traffic stop or even arrest or detain a suspect, the mobile device application 130 may store the collected data in a memory to which the user is restricted access, for example, random access memory (RAM). In this way, the mobile device application 130 may prevent the user from altering the collected data. In some embodiments, the mobile device application 130 may use a cyclic buffer in which newly collected data is written over the oldest collected data.

While data is being collected, the mobile device application 130 may detect a vehicle and/or vehicle license plate in various ways. In one embodiment, the user of the mobile device 106 may provide an input to indicate that a license plate is located within a frame of the image capture device 133. For example, the user may select a button, speak a voice command, or make a hand gesture that the mobile device application 130 recognizes as an indication that improper activity has occurred.

Upon detecting that a representation of a vehicle or license plate is in at least one image frame or upon recognizing a vehicle license plate number represented in at least one image frame, the mobile device application 130 may transmit the at least one image frame, any sensor data from sensors 139, and, if known, the license plate number represented in the at least one image frame. In addition, the mobile device application 130 may prevent at least a portion of the data collected prior to the time when the vehicle was detected from being discarded. Additionally, the mobile device application 130 may continue to collect data subsequent to the time when the vehicle was detected.

The mobile device 106 may transmit at least a portion of the data collected prior to and subsequent to the time when the vehicle was detected. Additionally, the mobile device 106 may transmit information, such as the identity of the user of the mobile device 106, the time when the vehicle was detected, the location of the mobile device 106 when the vehicle was detected, and/or any other information that may be useful for the target identification application 115. In some embodiments, the mobile device application 130 may wait to transmit the data to the target identification application 115 until the mobile device application 130 has joined a particular type of network, such as a local area network. By waiting to transmit the data until connected to such a network, the mobile device application 130 may avoid transmitting data using a cellular data network that may be relatively expensive and/or have relatively low bandwidth for the mobile device 106. In some embodiments, the mobile device application 130 may wait to transmit the data to the target identification application 115 until the mobile device application 130 has internet connectivity, such as a wireless 4G or 3G signal. By transmitting the data when a connection becomes available, the target identification application 115 may determine a location and time associated with the presence of a targeted vehicle.

As a non-limiting example, a vehicle associated with a criminal on the FBI watch list may be detected in Cleveland, Ohio when a police officer's mobile device 106 did not have network connectivity. The police officer's mobile device 106 could store the information and transmit it to target identification application 115 at a later time, such as four hours later. The target identification application 115 could initiate an action of notifying the FBI of the vehicle's location in Cleveland, Ohio, as well as the time the vehicle was recognized once the mobile device 106 establishes internet connectivity. In some embodiments, the action may include identify the location of one or more law enforcement individuals, for example, by requesting a location from one or more a mobile devices owned by the one or more law enforcement individuals. The action may also comprise identifying the law enforcement individuals that are proximate to where image frame was taken and transmit a notification to the identified law enforcement individuals indicating the location of the image frame and the targeted details 124 and/or 150.

The mobile device application 130 may provide an authentication mechanism for at least a portion of the data that is transmitted to the target identification application 115. For example, the mobile device application 130 may apply a hash function to at least a portion of the collected data. The hash value that is output when the hash function is applied may be transmitted to the target identification application 115 and used by the target identification application 115 to detect whether the collected data has been tampered with or manipulated, as will be described below. In some embodiments, the mobile device application 130 communicates to the target identification application 115 utilizing a security protocol, such as SSL. For example, the user device application and/or target identification application may obtain a private and a public key signed from a trusted certificate authority. The user device application and/or target identification application may require a valid signed public key signed by a trusted certificate authority before accepting communications from the other application. The mobile device application 130 may also encrypt at least a portion of the data that is transmitted to the target identification application 115. The target identification application 115 may also encrypt at least a portion of the data that is transmitted to the mobile device application 130. Encrypting the data may prevent unauthorized devices from accessing the content that is transmitted by the mobile device 106 and/or the computing environment 103.

After the target identification application 115 receives collected data from the mobile device 106, the target identification application 115 may begin processing the data. First, the target identification application 115 may decrypt the data using the appropriate key. If the mobile device application 130 provided a hash value with the data, the target identification application 115 may apply the hash function to at least a portion of the received data. If the hash value that results from the hash function matches the hash value that was provided by the mobile device application 130, the target identification application 115 may determine that the received data has not been tampered with or manipulated. If the hash values do not match, the target identification application 115 may determine that the received data has been manipulated and is not suitable for further processing. The target identification application 115 may discard the data if a hash fails or a decryption fails and inform the mobile device application 130 of the failure.

The target identification application 115 may initiate the process of detecting whether the image frames collected by the mobile device 106 show a representation of a vehicle. In some embodiments, the target identification application 115 may render the image frames for manual review by one or more trained technicians. For example, the target identification application 115 may render video, images, and/or any other content that was provided by the mobile device 106. The technician may then type in a license plate number identified in the image frames.

In various embodiments, the target identification application 115 may process one or more image frames by finding a representation of a license plate in the one or more image frames, segmenting the representation of the license plate into one or more images of characters, and performing optically character recognition (OCR) on each of the one or more images of characters to identify or generate a license plate number. In some embodiments, the software determines a confidence score for each of the one or more images of characters corresponding to how certain the identified character is represented in the image of a character. In some embodiments, the target identification application 115 may perform the OCR by using an artificial neural network. The target identification application 115 may compare the identified license plate number to a hotlist of targeted license plates, such as those stored in targeted license plates data store 141 and data store 112.

The target identification application 115 may compare using a fuzzy compare, such as approximate string matching. In some embodiments, the target identification application 115 may perform the fuzzy compare based on the confidence score. For example, the target identification application 115 may insert one or more wild cards in for one or more character that has a low confidence score. In the event that the identified license plate number is not found on one or more hotlists, the target identification application 115 may initiate an action, such as transmitting a notification to the mobile device 106 or sending a message to mobile device application 130. For example, the mobile device application 130 may be configured to securely store information such as image frames of a vehicle, and the target identification application 115 may send a message configured to cause the mobile device application 130 to discard the data corresponding to one or more image frame transmissions based on a determination that an identified license plate number is not on a hotlist.

The target identification application 115 may identify the identified license plate number as being a targeted license plate and initiate an action in response to the identification. For example, the target identification application 115 may transmit a message via SMS, APPLE IMESSAGE, GOOGLE HANGOUTS, BBM, or other messaging services to one or more user devices 106. The message may include information regarding the targeted vehicle, such as the information stored in targeted details 124 and 150, and/or information captured during the image capture from the sensors 139, such as GPS information or time the vehicle was identified. The message may also include one or more links to a webpage comprising further information. The target identification application 115 may generate a link corresponding to a map, for example Google Maps, from which the image frame of the vehicle was captured. The map may include an indicator illustrating the location and direction of travel of the vehicle when image frame was captured. The target identification application 115 may generate a link corresponding to a webpage comprising the one or more image frames, such as a web page comprising a photograph of the vehicle.

Figure 2:
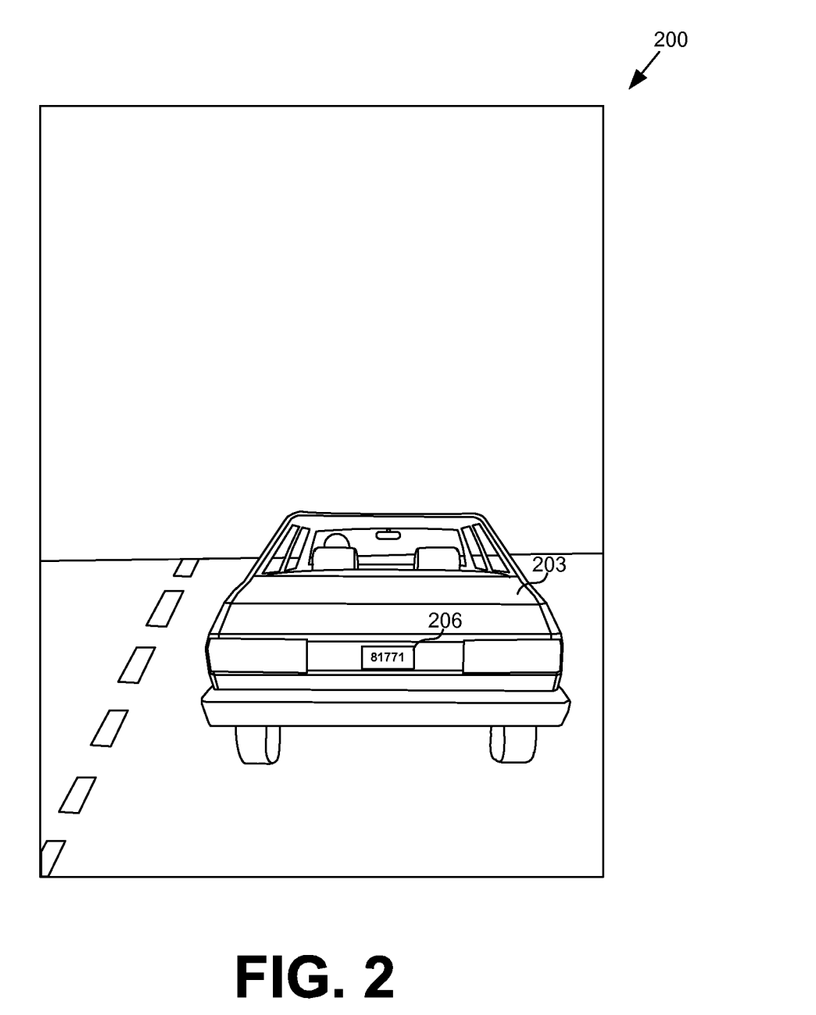
FIG. 2 is a drawing of an example of a captured image from a user device in the networked environment of FIG. 1 according to various embodiments of the present disclosure.

With reference to FIG. 2, shown is a drawing of an example of a user interface 200 that may be generated by the mobile device application 130 (FIG. 1) and rendered for display in the user device display 139 (FIG. 1). For the embodiment shown in FIG. 2, the mobile device 106 (FIG. 1) has been mounted on the dash of a vehicle and positioned so that the image capture device 133 (FIG. 1) generated image frames showing another vehicle 203 that is in front of the vehicle of the user.

The user interface 200 includes a rendering of an image frame that was generated by the image capture device 133. The user interface 200 may also show a live stream of images from the image capture device 133. The image frame shows the vehicle 203 with a license plate 206. Upon detection of the vehicle, the mobile device application 130 may capture one or more image frames and transmit the one or more image frames to the target identification application 115 via network 109. After transmitting the one or more captured image frames, the mobile device application 130 may continue to capture new image frames of the vehicle when available and transmit the new image frames to the target identification application 115, may capture one or more images of newly identified vehicles if available and transmit them to target identification application 115, and/or may continue showing the one or more image frames of the vehicle. The user interface 200 may include additional information overlaid over the image or live capture of the image capture device 133, such as direction of travel, speed, speed of the vehicle in front of the user.

Figure 3:
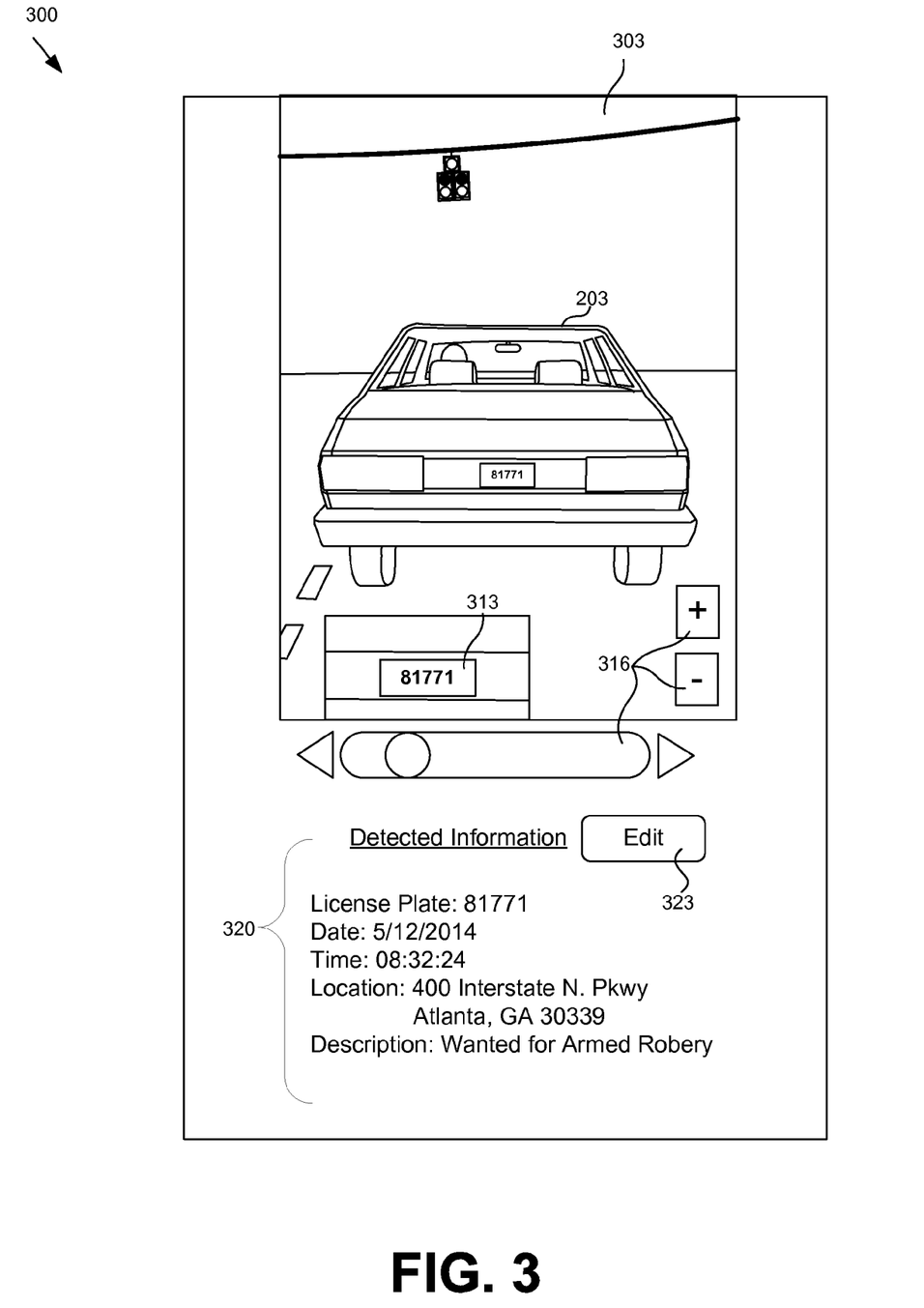
FIG. 3 is a drawing of an example of a user interface rendered by a user device in the networked environment of FIG. 1 according to various embodiments of the present disclosure.

With reference to FIG. 3, shown is an example of a user interface 200 that may be generated by the mobile device application 130 (FIG. 1) and rendered for display in the user device display 139 (FIG. 1). It is noted that one or more of the elements shown in the individual user interface 300 may be omitted in some embodiments.

The individual user interface 300 shown in FIG. 3 includes renderings of an image frame or live stream 303, detected information 320, and an edit button 323. The image frame comprises a representation of a vehicle 200, an enlargement of a license plate 313, and one or more control buttons 316. The control buttons 316 may facilitate an enforcement individual, such as a law enforcement officer, selecting one of multiple image frames to be rendered as the first image frame 306. Additionally, the control buttons 316 may facilitate the enforcement individual causing the image frame 303 to be zoomed in or zoomed out when rendered. Alternative embodiments may include additional functionality, such as "zoom to selected area" functionality, scroll functionality, multi-gesture zoom functionality, pinch to zoom, and/or other functionality. The functionality may be controlled by using touch screen controls and/or any other suitable type of interface.

The individual user interface 300 in the embodiment shown in FIG. 3 also includes detected information 320. The detected information 320 may include renderings of at least a portion of the targeted details 124 and/or 150 that the target identification application 115 obtained from data stores 118 and/or 141 and transmitted to the mobile device application 130 and renderings of at least a portion of the data obtained from the image frame and/or sensors 139 when the image frame was captured. For example, the detected information 320 may show renderings of the identified license plate, the date and time that the image frame was captured, the GPS location or address that the image frame was captured, and a description of why the vehicle is targeted.

The detected information region 320 may include renderings of information that the target identification application 115 detected from the collected data that was provided by the mobile device 106. For example, detected features of the vehicle 203, such as the make, model, and/or color of the vehicle 203, may be shown in the detected information region 320. The detected information region 320 may also show the type of detection mechanism that was used by the mobile device application 130 and/or the target identification application 115 to detect the license plate number. The detected information region 320 may also show the source of the targeted information, such as from the FBI most wanted, a police database, or an incident anonymously reported.

An edit button 323 is associated with the detected information region 320 in the individual user interface 300 shown in FIG. 3. An enforcement individual may select the edit button 323 and edit one or more data fields in the detected information region 320. For example, the enforcement individual may correct information in the data field that indicates the detected color of the vehicle 206. As a non-limiting example, the enforcement individual may correct the record to indicate that the vehicle was incorrectly targeted. The mobile device application 130 may transmit a message to the target identification application 115 configured to cause the target identification application 115 to delete the record corresponding to the vehicle from data stores 112 and/or 141.

Figure 4:
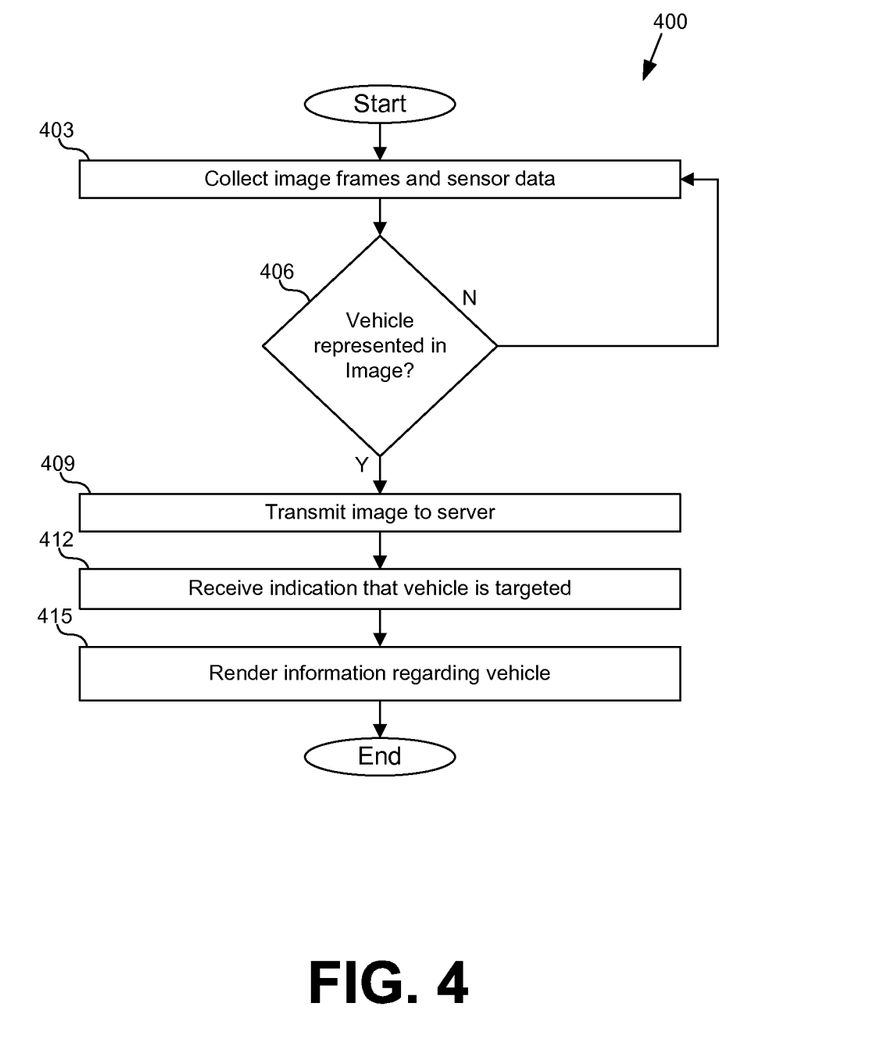
FIG. 4 is a flowchart representing an example of functionality implemented by the user device application executed in a user device in the networked environment of FIG. 1 according to various embodiments of the present disclosure.

With reference to FIG. 4, shown is a flowchart that represents a targeted vehicle client process 400 according to one or more embodiments. In some embodiments, the targeted vehicle client process 400 may be an example of the operation of a portion of the mobile device application 130 according to various embodiments. It is understood that the flowchart of FIG. 4 provides merely an example of the many different types of functional arrangements that may be employed to implement the operation of the mobile device application 130 as described herein. As an alternative, the flowchart of FIG. 4 may be viewed as depicting an example of steps of a method. In some embodiments, the steps of the method may be implemented in the mobile device 106 (FIG. 1) according to one or more embodiments.

Beginning with box 403, the targeted vehicle client process 400 involves collecting image frames and sensor data. For example, the mobile device application 130 may collect image frames provided by the image capture device 133 (FIG. 1) and/or sensor data provided by one or more sensors 139 (FIG. 1), such as remotely generated GPS location data and/or other data. At box 406, the targeted vehicle client process 400 involves determining if a vehicle is represented in one or more of the collected image frames and proceeding to box 409 if it does or to box 403 if not. For example, the mobile device application 130 may detect whether a vehicle is in one of the captured image frames. In some embodiments, the mobile device application 130 may detect a representation of a license plate of the vehicle in the image frame. In other embodiments, the mobile device application 130 may identify individual characters of the detected representation of the license plate and use OCR to identify a digital representation of the individual characters.

At box 409, the targeted vehicle client process 400 involves transmitting the image frame to the server. For example, mobile device application 130 may transmit the image frame and sensor data to the target identification application 115 via network 109 (FIG. 1). In some embodiments, the mobile device application 130 may transfer the data to an FTP Server executed in computing environment 103, upload them via a web server executed in computing environment 103, transmit them via TCP/IP or UDP data packets, or submit them via an application programming interface or remote procedure call. At box 412, the targeted vehicle client process 400 involves receiving an indication that the vehicle is identified as a targeted vehicle. For example, the mobile device application 130 may receive a message from the target identification application 115 comprising an indication that the vehicle is targeted and information about the vehicle, such as detected information 320 (FIG. 3). In some embodiments, the mobile device 106 may receive an SMS or similar message to indicate the vehicle is identified as being targeted. The message may also include one or more links to a webpage comprising further information. The link may corresponding to a map identifying the GPS location the image frame of the vehicle was captured, such as a link to Google Maps. The link may correspond to a webpage comprising the one or more image frames, such as a web page comprising a photograph of the vehicle. The mobile device 106 may open the link using a web browser and render a network page corresponding to the link on the mobile device display 136 (FIG. 1).

In box 415, the targeted vehicle client process 400 involves rendering information regarding the targeted vehicle. For example, mobile device application 130 may render the information on the mobile device display 136. In some embodiments, the mobile device application 130 may render individual user interface 300 on mobile device display 136. If the mobile device 106 receives a message, a messaging application may display the contents of the message on the mobile device display 136. The message may comprise an identity of who the message is from, a subject of the message, and a body of the message. The body of the message may comprise one or more links that may be opened in a web browser where the network page is rendered in mobile device display 136.

Figure 5:
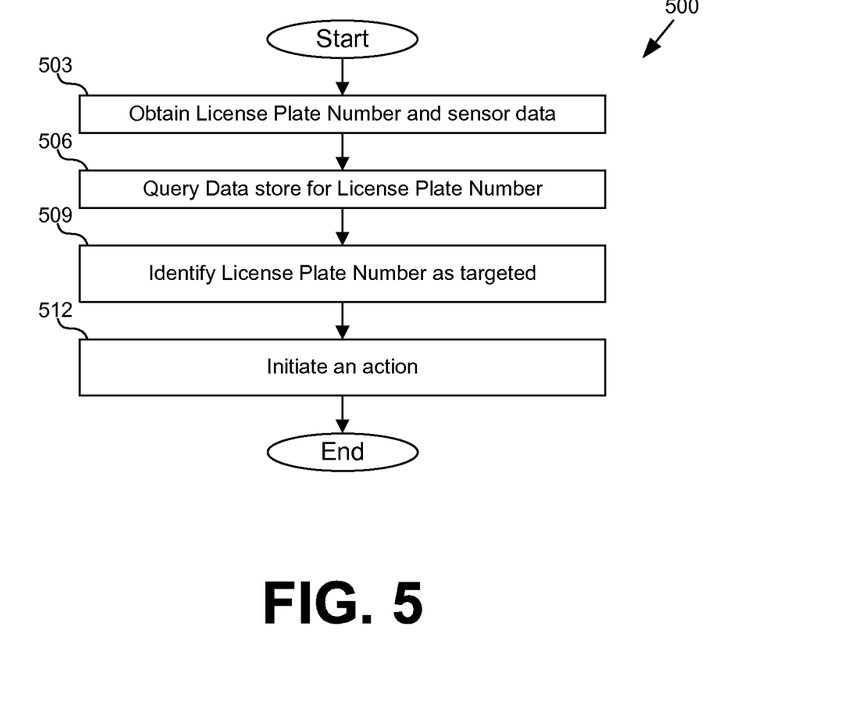
FIG. 5 is a flowchart representing an example of functionality implemented by the target identification application executed in a computing environment in the networked environment of FIG. 1 according to various embodiments of the present disclosure.

With reference to FIG. 5, shown is a flowchart that represents a targeted vehicle identification server process 500 according to one or more embodiments. In some embodiments, the targeted vehicle identification server process 500 may be an example of the operation of a portion of the target identification application 115 according to various embodiments. It is understood that the flowchart of FIG. 5 provides merely an example of the many different types of functional arrangements that may be employed to implement the operation of target identification application 115 as described herein. As an alternative, the flowchart of FIG. 5 may be viewed as depicting an example of steps of a method. In some embodiments, the steps of the method may be implemented in the computing environment 103 (FIG. 1) according to one or more embodiments.

Beginning with box 503, the targeted vehicle identification server process 500 involves obtaining a license plate number and sensor data. For example, target identification application 115 may receive a message via the network 109 comprising a license plate number and sensor data. In some embodiments, the target identification application 115 may detect a new one or more files uploaded to an FTP server executed in the computing environment where the one or more files comprise a license plate number and sensor data. In yet another embodiment, the license plate number and sensor data may be received via a website, received via a program TCP/IP or UDP/IP protocol, and/or received from a remote application calling a remote procedure call executed in the computing environment. The license plate number and sensor data may also be received via a restful web service, a SOAP based socket, and/or an XML based socket or XML-RPC. In box 506, the targeted vehicle identification server process 500 involves querying a data store for the license plate number. For example, the target identification application 115 may query the data store 112 and/or data store 141 for the license plate number received in box 503. The query may comprise a SQL query among other query methods. The target identification application 115 may use a fuzzy string search to locate any records from data store 112 and/or 141 indicating a vehicle is a targeted vehicle.

Figure 6:
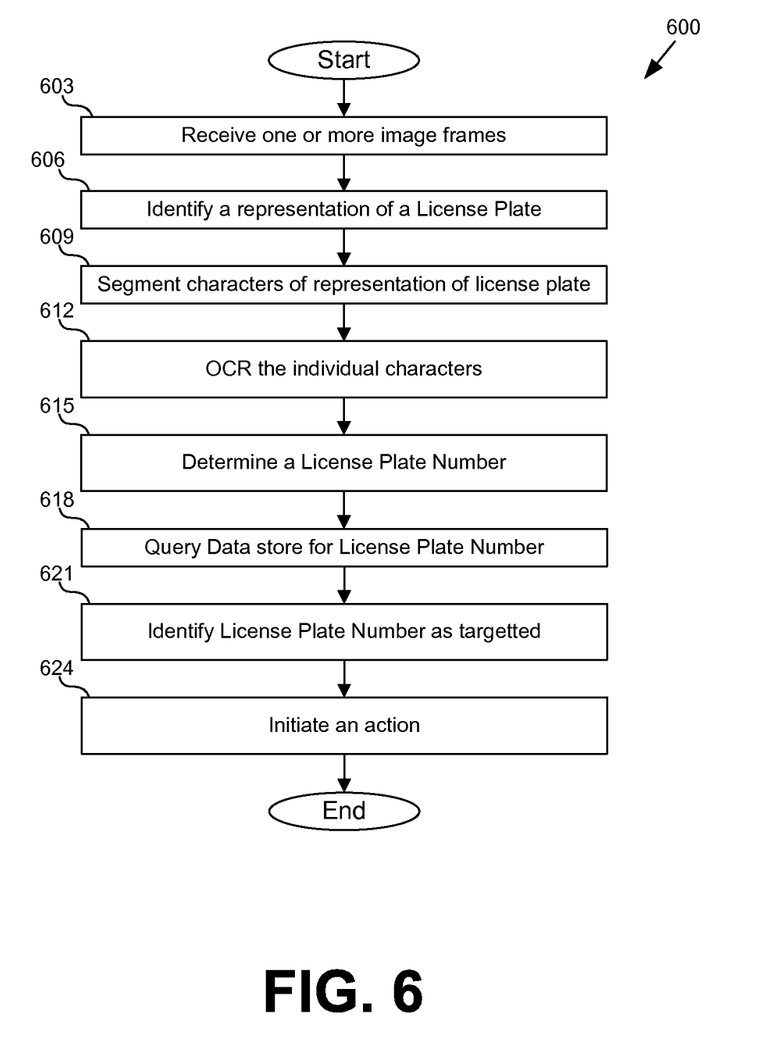
FIG. 6 is a flowchart representing an example of functionality implemented by the target identification application executed in a computing environment in the networked environment of FIG. 1 according to various embodiments of the present disclosure.

In box 509, the targeted vehicle identification server process 500 involves identifying the license plate number as being targeted. For example, the target identification application 115 may receive a result from the query that matches the license plate number queried in box 506. The result may also include targeted details 124 and/or 150. In box 512, the targeted vehicle identification server process 500 involves initiating an action. For example, target identification application 115 may transmit a message, such as an SMS message, APPLE IMESSAGE, GOOGLE HANGOUTS, BBM, or other known messaging system. The target identification application 115 may transmit a popup notification or an email notification to the mobile device. The message being configured to indicate that the vehicle has been identified as a targeted vehicle. The message may include one or more links to a website or network page, such as a page with a map of the GPS location when the image frame was captured or a photograph of the vehicle. The target identification application 115 may also transmit a message including the license plate number and additional data to one or more user device applications 130 indicating that the vehicle has been identified as a targeted vehicle. The additional data may comprise sensor data from sensors 139 from the mobile device 106 that captured the image frame, the targeted details 124 and/or 150, and DMV records related to the car, among other information. In some embodiments, the target identification application 115 identifies the location of a and transmits a message With reference to FIG. 6, shown is a flowchart that represents a targeted vehicle identification server process 600 according to one or more embodiments. In some embodiments, the targeted vehicle identification server process 600 may be an example of the operation of a portion of the target identification application 115 according to various embodiments. It is understood that the flowchart of FIG. 6 provides merely an example of the many different types of functional arrangements that may be employed to implement the operation of the target identification application 115 as described herein. As an alternative, the flowchart of FIG. 6 may be viewed as depicting an example of steps of a method. In some embodiments, the steps of the method may be implemented in the computing environment 103 (FIG. 1) according to one or more embodiments. Boxes 618, 621, and 624 in FIG. 6 have the same functionality as described for 506, 509, and 512 in FIG. 5, respectively.

Beginning with box 603, the targeted vehicle identification server process 600 involves receiving one or more image frames from a remote device. For example, the target identification application 115 may receive one or more images from the mobile device application 130 via the network 109. In some embodiments, the mobile device application 130 may transfer the data to an FTP Server executed in computing environment 103, upload them via a web server executed in computing environment 103, transmit them via TCP/IP or UDP data packets, or submit them via an application programming interface or remote procedure call. In box 606, the targeted vehicle identification server process 600 involves identifying a representation of a license plate in one of the one or more image frames. The target identification application 115 may use image recognition to identify a representation of a license plate in at least one of the one or more images, such as Computer vision. Computer vision comprises methods for acquiring, processing, analyzing, and understanding images in software. In some embodiments, the target identification application 115 may isolate the representation of the license plate to an isolated image to be processed in box 609. In some embodiments, the target identification application 115 may process the isolated image to enhance clarity and contrast, among other properties, of the isolated image to improve the accuracy if an OCR is executed on the isolated image.

In box 609, the targeted vehicle identification server process 600 involves segmenting representations of characters from an image. For example, targeted identification application 115 may segment the one or more representations of characters from an image, such as the isolated image. The segmentation may be performed using image recognition techniques, such as Computer vision. In box 612, the targeted vehicle identification server process 600 involves individually generating a letter, number, or symbol for the one or more representations of characters. For example, target identification application 115 may individually recognize a letter, number, or symbol in the one or more representations of characters based on an OCR of a respective representation of a character. In box 615, the targeted vehicle identification server process 600 involves determining a license plate number. For example, the targeted identification application 115 may order the identified characters according to the order of the representation of the characters in the isolated image to generate a license plate number.

Figure 7:
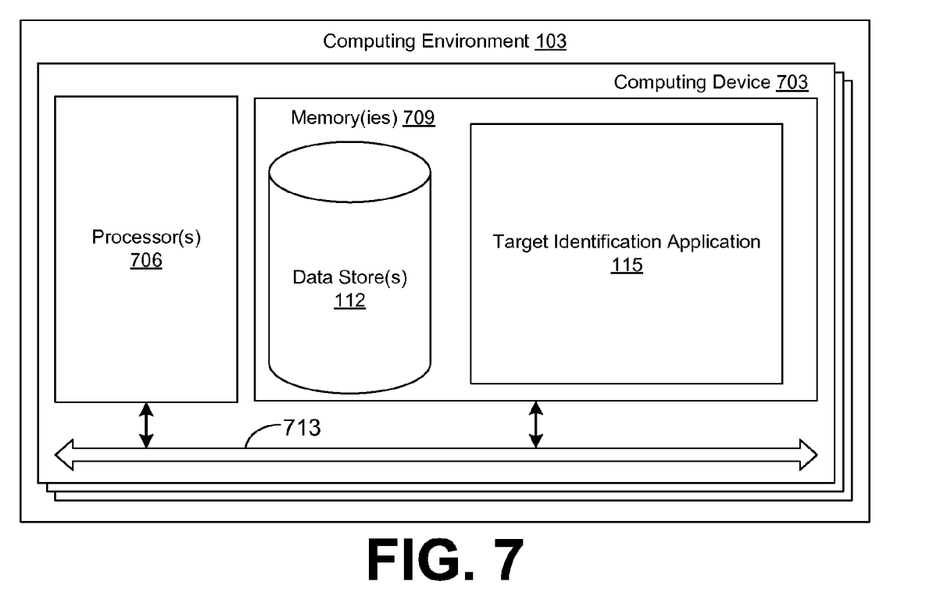
FIG. 7 is a schematic block diagram that provides an example illustration of a user device in the networked environment of FIG. 1 according to various embodiments of the present disclosure.

With reference to FIG. 7, shown is a schematic block diagram of the computing environment 103 according to an embodiment of the present disclosure. The computing environment 103 shown includes one or more computing devices 703. Each computing device 703 includes at least one processor circuit that may include one or more processors 706 and one or more memories 709, both of which are coupled to a local interface 713. As such, each computing device 703 may comprise, for example, at least one server computer or like device. The local interface 713 may comprise, for example, a data bus with an accompanying address/control bus or any other bus structure.

Stored in the memory 709 are both data and several components that are executable by the processor 706. In particular, stored in the memory 709 and executable by the processor 706 are the target identification application 115 and potentially other applications. Also stored in the memory 709 may be the data store 112 and other data. In addition, an operating system may be stored in the memory 709 and executable by the processor 706.

Figure 8:
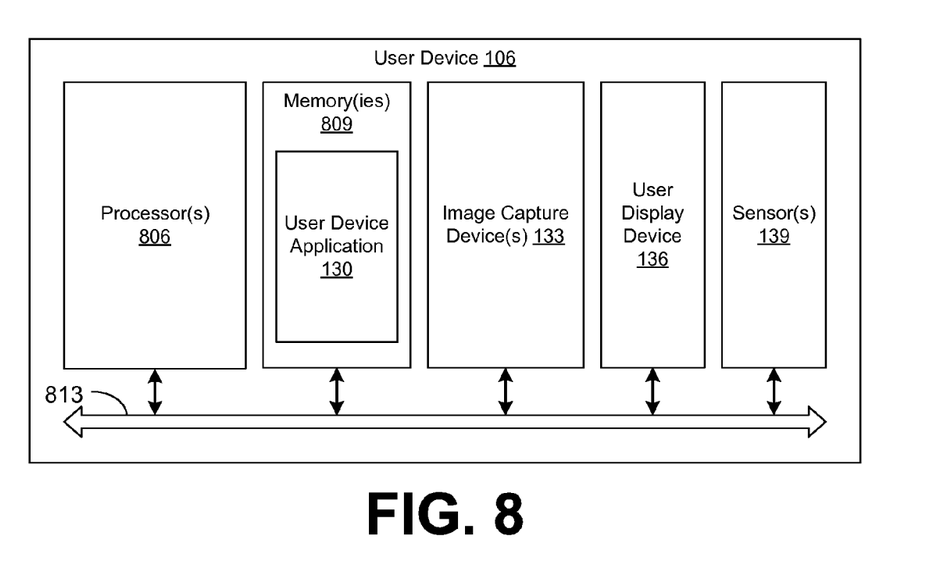
FIG. 8 is a schematic block diagram that provides an example illustration of a computing environment in the networked environment of FIG. 1 according to various embodiments of the present disclosure.

With reference to FIG. 8 shown is a schematic block diagram of the mobile device 106 according to an embodiment of the present disclosure. The mobile device 106 shown includes at least one processor circuit that may include one or more processors 806 and one or more memories 809, both of which are coupled to a local interface 813. One or more image capture devices 133, sensors 139, and or user device displays 136 may be coupled to the local interface 813. The local interface 813 may comprise, for example, a data bus with an accompanying address/control bus or any other bus structure.

Stored in the memory 809 are both data and several components that are executable by the processor 806. In particular, stored in the memory 809 and executable by the processor 806 are the mobile device application 130 and potentially other applications. In addition, an operating system may be stored in the memory 809 and executable by the processor 806.

It is understood that there may be other applications that are stored in the memories 709 and 809 and are executable by the processors 706 and 806, respectively, as may be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components may be stored in the memories 709 and 809 and be executable by the processors 706 and 806, respectively. In this respect, the term "executable" means a program file that is in a form that may ultimately be run by one or more of the processor 706 and 806. Examples of executable programs may be, for example, a compiled program that may be translated into machine code in a format that may be loaded into a random access portion of one or more of the memories 709 and 809 and run by one or more of the processors 706 and 806, source code that may be expressed in proper format such as object code that is capable of being loaded into a random access portion of the one or more of the memories 709 and 809 and executed by one or more of the processors 706 and 806, or source code that may be interpreted by another executable program to generate instructions in a random access portion of one or more of the memories 709 and 809 to be executed by one or more of the processors 706 and 806, etc. An executable program may be stored in any portion or component of one or more of the memories 709 and 809 including, for example, random access memory (RAM), read-only memory (ROM), a hard drive, a solid-state drive, a USB flash drive, a memory card, an optical disc, a floppy disk, a magnetic tape, or any other suitable type of memory.

The memories 709 and 809 may include both volatile and nonvolatile memory and data storage components. Volatile components are those that do not retain data values upon loss of power. Nonvolatile components are those that retain data upon a loss of power. Thus, the memories 709 and 809 may comprise, for example, random access memory (RAM), read-only memory (ROM), a hard disk drive, a solid-state drive, a USB flash drive, a memory card accessed via a memory card reader, a floppy disk accessed via a floppy disk drive, an optical disc accessed via an optical disc drive, a magnetic tape accessed via a tape drive, another memory component, or any combination of two or more of these memory components. In addition, the RAM may comprise, for example, static random access memory (SRAM), dynamic random access memory (DRAM), or magnetic random access memory (MRAM) and other such components. The ROM may comprise, for example, a programmable read-only memory (PROM), an erasable programmable read-only memory (EPROM), an electrically erasable programmable read-only memory (EEPROM), or other like memory component.

Also, each of the processors 706 and 806 may represent multiple processors and/or multiple processor cores, and each of the memories 709 and 809 may represent multiple memories that operate in parallel processing circuits, respectively. In such a case, each of the local interfaces 713 and 813 may be an appropriate network that facilitates communication between any two of the respective multiple processors 706 and 806, between any processor 706 and 806 and any of the respective memories 709 and 809, or between any two of the respective memories 709 and 809, etc. The each of local interfaces 713 and 813 may comprise additional systems, such as a load balancing system, designed to coordinate this communication. The processors 706 and 806 may be of electrical or of some other available construction.

Although the target identification application 115 and the mobile device application 130 (FIG. 1), and other various systems described herein may be embodied in software or code executed by general purpose hardware as discussed above, the same may be embodied in dedicated hardware or a combination of software/general purpose hardware and dedicated hardware. If embodied in dedicated hardware, each application or system may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5-6 show the functionality and operation of portions of the mobile device application 130 and the target identification application 115, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as one or more of the processors 706 and 806 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more boxes may be switched relative to the order shown. Also, two or more boxes shown in succession in flowcharts of FIGS. 4-6 may be executed concurrently or with partial concurrence. Further, in some embodiments, one or more of the boxes shown in flowcharts of FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the target identification application 115 and the mobile device application 130, that comprises software or code may be embodied in any non-transitory computer-readable medium for use by or in connection with an instruction execution system such as, for example, one or more of the processors 706 and 806 in a computer system or other system. In this sense, the logic may comprise, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the target identification application 115 and the mobile device application 130, may be implemented and structured in a variety of ways. For example, one or more applications described may be implemented as modules or components of a single application. Further, one or more applications described herein may be executed in shared or separate devices or a combination thereof. For example, a plurality of the applications described herein may execute in the same computing device 703 or 803, or in multiple computing devices in the same computing environment 103. Additionally, it is understood that terms, such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying computer instructions executable by a mobile computing device, wherein the computer instructions, when executed by the mobile computing device, are configured to cause the mobile computing device to at least:

identify a vehicle license plate being within a frame of an image capture device of the mobile computing device, the vehicle license plate being within the frame at a time of identification;

collect at least one image captured via the image capture device and a plurality of sensor information in association with the at least one image, the plurality of sensor information captured from a plurality of sensors of the mobile computing device;

in response to identifying the vehicle license plate being within the frame, store, in a memory of the mobile computing device, data comprising at least one image captured at the time of identification, and at least a subset of the plurality of sensor information captured after the time of identification, wherein access to the data is restricted to prevent alteration of the data;

transmit a request to a remote server including the data, the request configured to cause the remote server to identify a license plate number in the at least one image and determine that the license plate number is represented in a list of a plurality of targeted license plates;

receive a notification from the remote server comprising a plurality of information, the notification indicating that the vehicle license plate represented in the least one at least one image corresponds to a targeted vehicle; and render a user interface comprising the plurality of information on a mobile display of the mobile computing device, the plurality of information based at least in part on the plurality of sensor information.

2. The non-transitory computer-readable medium of claim 1, wherein the mobile computing device is a cellular phone positioned on a dashboard of a police vehicle.

3. The non-transitory computer-readable medium of claim 1, wherein the plurality of information comprises a description of an unlawful activity committed by an individual associated with the license plate number.

4. The non-transitory computer-readable medium of claim 3, wherein the unlawful activity comprises at least one of abducting a child, stealing from a bank, having an outstanding arrest warrant, being accused of committing a crime, committing a traffic infraction, or being reported as a person committing suspicious activity.

5. The non-transitory computer-readable medium of claim 1, wherein the at least one image comprises at least one of a photograph or a frame of a video.

6. The non-transitory computer-readable medium of claim 1, wherein the user interface corresponds to an SMS application executed on a smartphone.

7. The non-transitory computer-readable medium of claim 1, wherein the user interface comprises a map application executed on a smartphone and the map application comprises an indicator on a map of the map application, the indicator illustrating a location corresponding to the at least one image and a direction of travel associated with the of the image, location and direction of travel being based at least in part on the plurality of sensor information.

8. A system comprising:
a mobile computing device; and
at least one computing device in communication with the mobile computing device, the at least one computing device being configured to at least:
obtain a list of a plurality of targeted license plate numbers from a database;
obtain, from the mobile computing device, data comprising an image and a plurality of sensing information associated with the image, a subset of the plurality of sensing information associated with the image being collected by the mobile computing device prior to or subsequent to the image being captured by the mobile computing device, wherein the mobile computing device stores the data in a memory of the mobile computing device, and access to the memory is restricted to prevent alteration of the data;
identify a license plate number represented in the image;
determine that the license plate number is represented in the list of the plurality of targeted license plate numbers obtained from the database; and
initiate an action in response to determining that the license plate number is represented in the list of the plurality of targeted license plate numbers.

9. The system of claim 8, wherein the at least one computing device is further configured to at least:
detect a region of the image that represents a license plate;
detect a plurality of license plate characters represented within the region of the image that represents the license plate; and
identify the plurality of license plate characters.

10. The system of claim 9, wherein the at least one computing device is further configured to at least compare the plurality of license plate characters with the list of the plurality of targeted license plate numbers to determine that the license plate number is represented in the list of the plurality of targeted license plate numbers.

11. The system of claim 10, wherein approximate string matching is used to compare the plurality of license plate characters with the list of the plurality of targeted license plate numbers.

12. The system of claim 8, wherein the image comprises at least one of a photograph or a frame of a video.

13. The system of claim 8, wherein each of the plurality of targeted license plate numbers are associated with an alleged crime, an alleged traffic infraction, an arrest warrant, or a reported suspicious activity.

14. The system of claim 8, wherein the action comprises the at least one computing device being further configured to at least:
identify a plurality of locations individually corresponding to a plurality of law enforcement individuals;
identify a location of the image based at least in part on the plurality of sensing information associated with the image;
identify a subset of the plurality of law enforcement individuals based at least in part on a proximity of the ones of the plurality of locations individually corresponding to the plurality of law enforcement individuals to the location of the image; and
transmit a notification to the subset of the plurality of law enforcement individuals indicating the location of the image and a description of an unlawful activity committed by an individual associated with the license plate number.

15. The system of claim 8, wherein the at least one computing device is further configured to at least:
generate a first link corresponding to the image; and
generate a second link corresponding to a map comprising an indication of a location associated with the image, wherein the action comprises transmitting a notification including the first link and the second link.

16. A computer-implemented method comprising:
obtaining, via at least one computing device, a list of a plurality of targeted license plate numbers from a database;
detecting, via at least one computing device, a representation of a vehicle license plate being within an image captured by an image capture device of a mobile computing device;
storing in a data store, data comprising the image and a plurality of sensor information collected by the mobile computing device, a subset of the plurality of sensor information being collected prior to the representation of the vehicle license plate being detected, wherein access to the data store is restricted to prevent alteration of the data;
obtaining, via the at least one computing device, the image from the mobile computing device;

obtaining, via the at least one computing device, the subset of the plurality of sensor information collected before the representation of vehicle license plate was detected;

identifying, via the at least one computing device, a license plate number represented in the image;

determining, via the at least one computing device, that the license plate number is represented in the list of the plurality of targeted license plate numbers obtained from the database; and initiating, via the at least one computing device, an action in response to determining that the license plate number is represented in the list of the plurality of targeted license plate numbers.

17. The computer-implemented method of claim 16, further comprising:

detecting, via the at least one computing device, a region of the image that represents a license plate;

detecting, via the at least one computing device, a plurality of license plate characters represented within the region of the image that represents the license plate; and identifying, via the at least one computing device, the plurality of license plate characters.

18. The computer-implemented method of claim 17, further comprising comparing, via the at least one computing device, the plurality of license plate characters with the list of the plurality of targeted license plate numbers to determine that the license plate number is represented in the list of the plurality of targeted license plate numbers.

19. The computer-implemented method of claim 18, wherein approximate string matching is used to compare the plurality of license plate characters with the list of the plurality of targeted license plate numbers.

20. The computer-implemented method of claim 16, wherein the image comprises a still image or a video image.

* * * * *